Patented Feb. 23, 1937

2,071,993

UNITED STATES PATENT OFFICE 2,071,993

TRIMETHINE CYANINE DYES

Walter Zeh, Dessau in Anhalt, Willi Gaedke, Hofheim in Taunus, Martin Dabelow, Frankfort-on-the-Main-Hochst, and Werner Zerweck, Frankfort-on-the-Main-Fechenheim, Germany, assignors to Agfa Ansco Corporation, Binghamton, N. Y., a corporation of New York No Drawing. Original application July 8, 1932, Serial No. 621,474. Divided and this application February 19, 1934, Serial No. 712,072. In Germany July 11, 1931

3 Claims. (Cl. 260—44)

Our present invention relates to the manufacture of dyes of the cyanine series. It is a division of our co-pending application Ser. No. 621,474, filed July 8, 1932.

One of its objects is to provide cyanine dyes in which two thiazole nuclei having fused on a condensed ring system of more than 2 nuclei are linked together by a tri-methenyl chain. Further objects will be seen from the detailed specification following hereafter.

We have found that the thiazole-trimethinecyanines which are derived from higher polynuclear cyclic compounds are well suitable for sensitizing a silver halide emulsion to red and have over the hitherto known carbocyanines the advantage of a higher intensity in the spectral red.

As a starting material for the new sensitizing dyestuffs there may be used the 2-methyl-thiazole of Anthracene 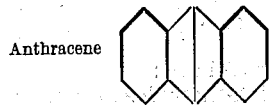

Phenantrene 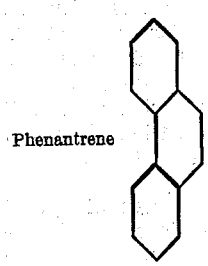

Acenaphthene 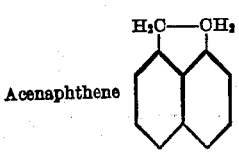

Fluorene 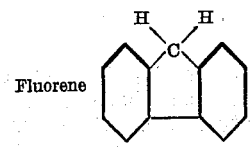

Chrysene 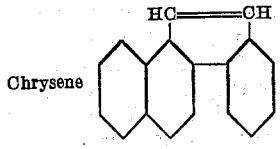

Carbazole 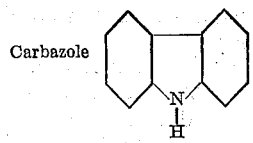

Diphenylene-oxide 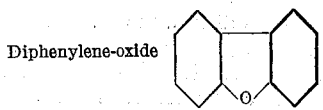

The dyestuffs are obtainable analogous to known methods. In order to prepare, for instance, the anthrathiocarbocyanines, one starts from $\alpha$- or $\beta$-athramine and, by way of its acetyl- and thioacet-compound, the 2-methylanthrathiazole is obtainable by oxidation with potassium ferricyanide. By treating the 2-methylanthrathiazole with diethylsulfate or ethyltoluenesulfonate in known manner it is transformed into the quaternary compound which is then condensed in anhydrous pyridine to a trimethinecyanine by means of a trialkylorthocarboxylic acid ester. When condensing anthrathiazole with an alkylorthoformic ester, there are obtained trimethinecyanines of the following formulae (wherein R stands for an alkyl radical and X for an anion):

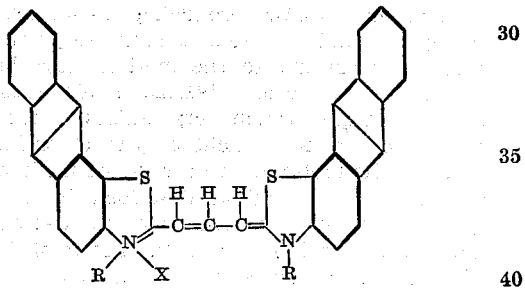

α-compound

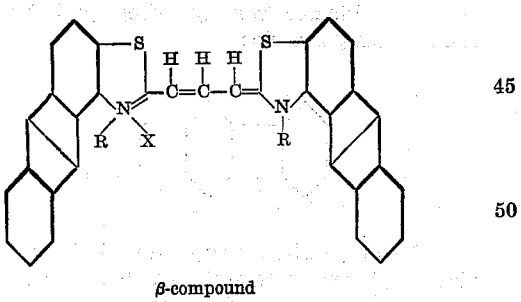

β-compound

If the condensation is carried out with the ester of a higher orthocarboxylic acid, the hydrogen of the central C-atom of the chain is subsituted by an alkyl group. The dyestuffs substituted in this manner possess a more intensive sensitizing action, the compounds having a hydroxyalkyl substituent showing a better solubility in water. The scope of the invention is intended to include also such dyestuffs as are substituted in any manner in the anthracene-phenanthrene- etc. rings or in which the sulphur of the thiazole ring has been replaced by oxygen, or selenium.

The following examples serve to illustrate our invention more clearly. Examples 1 and 2 instance the manufacture of the bases our sensitizers are made from, the method of preparation being like that of the dyes analogous to known methods. Examples 3 to 8 demonstrate the manufacture of the dyes when starting from the bases.

*Example 1.*—2-methyl-carbazolethiazole is prepared as follows:

9-benzoyl-3-aminocarbazole (melting point 148 to 150° C.) is transformed into 9-benzoyl-2-aminothiazole according to the process described in German specification 491,223. Said compound forms colorless needles having a melting point of 280° C. when recrystallized from glacial acetic acid. After cleaving the molecule according to the method indicated in German specification 495,102 o-mercapto-3-aminocarbazole is obtained, the benzoyl residue being split off at the same time. The compound is preferably separated in form of the zinc mercaptide. By heating the product with acetic anhydride and glacial acetic acid the 2-methylthiazole is obtainable, corresponding probably with the following formula:

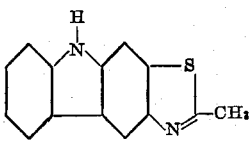

and forming when recrystallized from diluted alcohol colorless crystals which melt at 165° C.

*Example 2.*—For producing 2 - methyl - di - phenylene-oxide-thiazole 2-amino-diphenylene-oxide is according to the method described in German specification 491,223 made into the amino-thiazole which crystallizes from hot diluted hydrochloric acid as the chloride. By cleaving the molecule in an alkaline medium according to the method described in German specification 495,102 the o-mercapo-2-amino-diphenylene-oxide is separated in form of its zinc mercaptide. When heated with acetic anhydride and glacial acetic acid this compound yields the 2-methyl-thiazole corresponding probably with the following fomula:

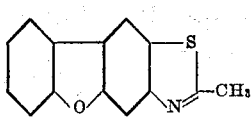

and forming when recrystallized from diluted alcohol glittering crystals which melt at 162° C.

*Example 3.*—The dye bis-{ 3-ethyl-[anthraceno-2'.1':4.5-thiazole]-(2) }-β-ethyl-trimethinecyanine bromide corresponding probably with the formula:

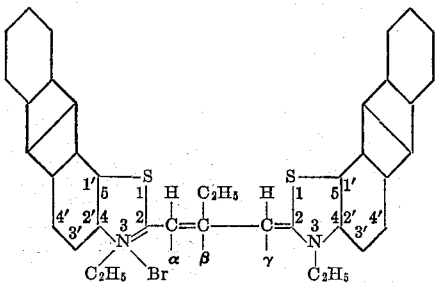

is obtained by heating 5 grams of 2-methyl-β-anthrathiazole-diethylsulfate in 10 cc. of dry pyridine with 5 cc. of ethyl-ortho-propionate for about ½ hour to about 130° C. Hereon the dye is precipitated by addition of about 100 cc. of a 5 per cent solution of potassium bromide. By recrystallization from methanol a blackish-green crystal powder is obtainable.

The alcoholic solution of the dye has an absorption maximum at a wave length of about 610μμ.

*Example 4.*—The dye bis-{ 3-ethyl-[anthraceno-1'.2':4.5-thiazole]-(2) }-β-ethyl-trimethinecyanine bromide is produced by starting from 2-methyl-α-anthrathiazole-diethylsulfate, the reaction and the conditions being the same as in Example 3.

*Example 5.*—The dye bis-{ 3-ethyl-[carbazolo-3'.2':4.5-thiazole]-(2) }-trimethinecyanine chloride corresponding with the formula:

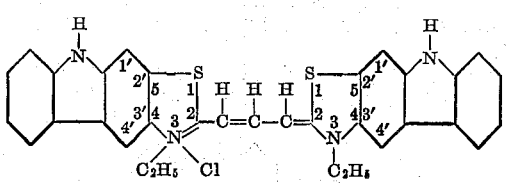

is obtainable as follows:

5 grams of 2-methylcarbazole-diethyl-sulfate are heated with 3 cc. of ethyl-ortho-formate in 10 cc. of pyridine for about 1½ hours to 130° C. On the addition of sodium chloride the dye precipitates from the blue solution. Recrystallization from methanol yields green little rods.

The alcoholic solution of the dye shows an absorption maximum at a wave length of about 605μμ.

*Example 6.*—The dye bis-{ 3-ethyl-[acenaphtheno - 5'.4': 4.5-thiazole] - (2) }-β-methyl-trimethine cyanine bromide corresponding with the formula

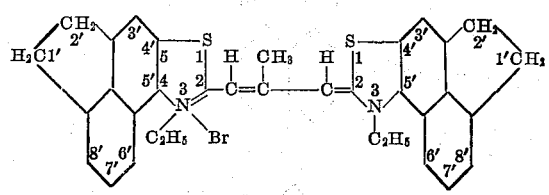

is obtainable by heating 3 grams of 5-methyl-acenaphthene thiazole-diethylsulfate in 10 cc. of dry pyridine with 3 cc. of ethyl-ortho-acetate for about ½ hour to 130° C. The dye is precipitated by adding to the reaction mixture about 100 cc. of a 5 per cent solution of potassium bromide. After recrystallization from methanol it forms small blue needles which are felted.

The alcoholic solution of the dye has an absorption maximum at about 585μμ.

*Example 7.*—The dye bis-{3-methyl-[diphenyleneoxide - 2'.3':4.5 - thiazole] - (2)}-β-methyl-trimethinecyanine chloride corresponding with the formula:

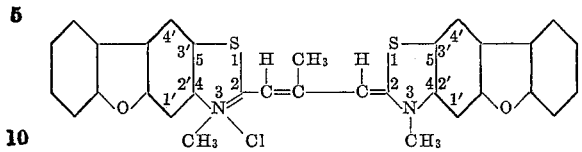

may be produced by heating 2.5 grams of diphenlyeneoxide 2-methylthiazole and 4 cc. of ethyl-ortho-acetate with 10 cc. of pyridine for about ½ hour to 130° C. The dye which precipitates already during the heating operation in form of its sulfalkylate is separated from the mother liquid by suction. The dye is then dissolved in methanol and precipitated by addition of a 10 per cent solution of common salt.

The alcoholic solution of the dye shows an absorption maximum at a wave length of about 585μμ.

It is to be understood that our invention is not limited to the foregoing examples or to the specific details given therein. Numerous other embodiments are possible and we contemplate as included within our invention all such modifications and equivalents as fall within the scope of the appended claims. So, for instance the different nuclei may contain one or more substituents. The formulae of the dyes as given therein represents the molecular structure of our new dyes so far as known. If, however, in future it should become evident that the formulae do not exactly correspond to the dyes this fact will not affect our invention since the dyes will be easily identified by the method of producing the same which has been fully described in the examples and is analogous to known methods.

What we claim is:

1. Bis{3-ethyl-[carbazolo - 3'2'-4.5 - thiazole]-(2)} trimethinecyamine-chloride corresponding probably with the formula

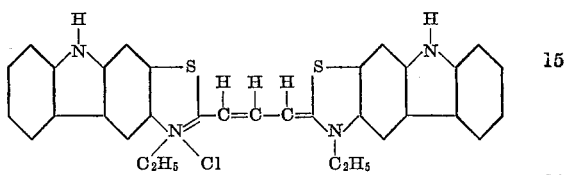

and having in its alcoholic solution an absorption maximum at a wave length of about 605μμ.

2. A dye selected from the group consisting of bis-{3 - alkyl - [carbazolo : thiazole] - (2)} -trimethine-cyanine salts and bis-{3-alkyl-[carbazolo : selenazole]-(2)} trimethine-cyanine salts.

3. A bis-{3-alkyl-[carbazolo : thiazole]-(2)}-β-alkyl-trimethine-cyanine salt.

WALTER ZEH.
WILLI GAEDKE.
MARTIN DABELOW.
WERNER ZERWECK.